United States Patent
Ahn (10) Patent No.: US 11,741,461 B2
(45) Date of Patent: Aug. 29, 2023

(54) METHOD FOR PERFORMING NON-REPUDIATION, AND PAYMENT MANAGING SERVER AND USER DEVICE THEREFOR

(71) Applicant: LG CNS CO., LTD., Seoul (KR)

(72) Inventor: Taehoon Ahn, Seoul (KR)

(73) Assignee: LG CNS CO., LTD., Seoul (KR)

( * ) Notice: Subject to any disclaimer, the term of this patent is extended or adjusted under 35 U.S.C. 154(b) by 956 days.

(21) Appl. No.: 14/938,800

(22) Filed: Nov. 11, 2015

(65) Prior Publication Data

US 2016/0140548 A1    May 19, 2016

(30) Foreign Application Priority Data

Nov. 13, 2014  (KR) .......................... 10-2014-0157919

(51) Int. Cl.
*G06Q 20/38*    (2012.01)
(52) U.S. Cl.
CPC ..... *G06Q 20/3829* (2013.01); *G06Q 2220/00* (2013.01)
(58) Field of Classification Search
CPC .................................................. G06Q 20/332
USPC ..................................................... 705/71, 75
See application file for complete search history.

(56) References Cited

U.S. PATENT DOCUMENTS

| | | | |
|---|---|---|---|
| 9,626,821 B2* | 4/2017 | Roberts | G07F 7/0886 |
| 9,628,282 B2* | 4/2017 | Khalil | H04L 63/168 |
| 9,842,335 B2* | 12/2017 | Hayhow | G06Q 20/02 |
| 2008/0019527 A1* | 1/2008 | Youn | H04L 63/0807 380/278 |
| 2008/0120504 A1* | 5/2008 | Kirkup | H04L 9/003 713/176 |

(Continued)

FOREIGN PATENT DOCUMENTS

| | | |
|---|---|---|
| JP | 2000-076369 A | 3/2000 |
| JP | 2001-325469 A | 11/2001 |

(Continued)

OTHER PUBLICATIONS

Ken Kuroiwa et al., "Implementation and Evaluation of E-Commerce and Authetication System Using Cellular Phones", IMES Discussion Paper Series, Jul. 2010, pp. 1253-1261.

(Continued)

*Primary Examiner* — Chinedu C Agwumezie (57) ABSTRACT

A method for implementing non-repudiation of payment in a payment managing server includes receiving, from a user terminal, a terminal public key of a pair of asymmetric keys generated by the user terminal, receiving user authentication information, the user authentication information having been generated by a user authentication server and transmitted to the user terminal, storing the received terminal public key when validity of the user authentication information is confirmed through a communication with the user authentication server, receiving a payment request from the user terminal, receiving, from the user terminal, electronic signature information that has been encrypted with a terminal private key of the pair of asymmetric keys and decrypting the electronic signature information using the stored terminal public key, is provided.

6 Claims, 5 Drawing Sheets

(56) References Cited

U.S. PATENT DOCUMENTS

| | | | | |
|---|---|---|---|---|
| 2015/0019442 A1* | 1/2015 | Hird | .................... | H04W 12/041 |
| | | | | 726/30 |
| 2015/0066778 A1* | 3/2015 | Jang | ....................... | G06Q 20/20 |
| | | | | 705/71 |
| 2015/0310431 A1* | 10/2015 | Lakshmanan | .......... | G06Q 20/02 |
| | | | | 705/71 |
| 2016/0078437 A1* | 3/2016 | Tahon | ....................... | H04L 9/14 |
| | | | | 705/77 |

FOREIGN PATENT DOCUMENTS

| | | | |
|---|---|---|---|
| JP | 2010-539856 A | | 12/2010 |
| KR | 10-2006-0097583 A | | 9/2006 |
| KR | 10-2007-0105826 A | | 10/2007 |
| KR | 20120059474 A | * | 6/2012 |
| KR | 10-2014-0054118 A | | 5/2014 |
| WO | WO 2008/120334 A1 | | 10/2008 |
| WO | WO 2009/050924 A1 | | 4/2009 |

OTHER PUBLICATIONS

Mitsuru Iwamura et al. "Alibi certification problem and temporal proof problem in digital signature", Nov. 2000, pp. 42-48, vol. 32, No. 11, bit.

* cited by examiner

METHOD FOR PERFORMING NON-REPUDIATION, AND PAYMENT MANAGING SERVER AND USER DEVICE THEREFOR

The present application claims priority under 35 U.S.C. § 119(a) to Korean Patent Application Number 10-2014-0157919, filed on Nov. 13, 2014, in the Korean Intellectual Property Office, which is incorporated herein by reference in its entirety as set forth in full.

BACKGROUND

1. Technical Field

Embodiments of the present disclosure relate to a method for performing non-repudiation, and a payment managing server and a user device therefor. More specifically, embodiments of the present disclosure relate to a method for performing non-repudiation using user authentication and an asymmetric encryption key, and a payment managing server and a user device therefor.

2. Related Art

Recently, the development of technology has led to online bill payment in various fields including the field of online shopping.

In the field of online payment, in addition to performing user authentication, it has become an important issue for transaction parties to prevent a user from repudiating an online payment he or she has made.

Non-repudiation is a security technique for preventing repudiation of facts by proving that messages have been sent or received or that an online transaction has been made.

Non-repudiation may be used to prevent member shops, etc. who have received payment, from denying the fact that the payment was made and may also be used to prevent a user who made the payment from arguing that he/she did not make the payment.

Conventionally, non-repudiation has been performed by including a trusted third party (TTP) such as a certification authority. As such, non-repudiation could be implemented by making an institute that both a user and a member shop can trust manage online payment related information. However, there is a disadvantage that a process for performing non-repudiation becomes complex when a third party intervenes, and it is also difficult to establish a cooperation system with a third party itself.

Accordingly, a need for a new model that may effectively prevent repudiation for online payment is on the rise.

SUMMARY

Embodiments of the present disclosure are provided to solve the above-described problems of prior art.

An object of the present disclosure is to provide a payment method with enforced security by performing encryption and decryption using an asymmetric key generated by a user terminal.

Another object of the present disclosure is to implement non-repudiation in steps of requesting user authentication to completing payment, without involving a trusted third party.

In order to achieve the above object, an embodiment of the present invention provides a method for implementing non-repudiation in a payment managing server, the method including receiving, from user terminal, a terminal public key of a pair of asymmetric keys generated by the user terminal, receiving user authentication information, the user authentication information having been generated by a user authentication server and transmitted to the user terminal, storing the received terminal public key when the validity of the user authentication information is confirmed through a communication with the user authentication server, receiving a payment request from the user terminal, receiving, from the user terminal, electronic signature information that has been encrypted with a terminal private key of the pair of asymmetric keys, and decrypting the electronic signature information using the stored terminal public key.

The terminal public key and the user authentication information may be sent to the payment managing server after having been encrypted by the user terminal by using a server public key provided by the payment managing server.

The method for implementing non-repudiation in a payment managing server may include generating a non-repudiation token based on the electronic signature information and payment related information, and sending the non-repudiation token to at least one of a member shop server and the user terminal.

The method for implementing non-repudiation in a payment managing server may include generating a master key and sending the master key to the user terminal in response to a request for registering a payment means from the user terminal, wherein the user terminal encrypts payment means information with the master key and then delete the master key after the encryption of the payment means information.

The method for implementing non-repudiation in a payment managing server may include generating log information relating to a payment process and sending the log information to a public electronic document storage server.

In order to achieve the above object, another embodiment of the present invention provides a method for implementing non-repudiation of payment in a user terminal, the method including generating a pair of asymmetric keys including a terminal public key and a terminal private key, sending the terminal public key to a payment managing server, encrypting user authentication information with a server public key provided by the payment managing server and sending the encrypted user authentication information to the payment managing server, such that the payment managing server stores the terminal public key when the validity of the user authentication information is confirmed through a communication with a user authentication server, wherein the user terminal receives the user authentication information from the user authentication server as a result of performing user authentication in the user authentication server, and encrypting electronic signature information with the terminal private key and sending the encrypted electronic signature information to the payment managing server when there is a request for payment.

The terminal public key may be sent to the payment managing server after having been encrypted with the server public key provided by the payment managing server.

The method for implementing non-repudiation in a user terminal may include receiving a master key a first time from the payment managing server when registering a payment means, encrypting payment means information with the master key, deleting the master key after the encryption of the payment means information, receiving the master key a second time, after deleting the master key, from the payment managing server and decrypting the encrypted payment means information with the master key, when there is the request for payment.

The method for implementing non-repudiation in a user terminal may include receiving an access password and activating the terminal private key when the access password is the same as a pre-stored access password.

In order to achieve the above object, another embodiment of the present invention provides a payment managing server for implementing non-repudiation of payment, including a terminal public key managing unit for receiving a terminal public key of a pair of asymmetric keys from a user terminal, a user authentication information managing unit for receiving, from the user terminal, user authentication information generated by a user authentication server and transmitted to the user terminal, a terminal public key validity confirming unit for conforming the validity of the terminal public key based on the validity of the user authentication information and storing the terminal public key when the validity of the user authentication information is confirmed, and an electronic signature information managing unit for receiving electronic signature information that has been encrypted with a terminal private key of the pair of asymmetric keys together with a payment request from the user terminal and decrypting the electronic signature information with the stored terminal pubic key.

In order to achieve the above object, another embodiment of the present invention provides a user terminal for implementing non-repudiation of payment, including an asymmetric key managing unit for generating a pair of asymmetric keys including a terminal public key and a terminal private key, a terminal public key validity managing unit for sending the terminal public key to a payment managing server, and encrypting user authentication information with a server public key provided by the payment managing server and sending the encrypted user authentication information to the payment managing server, such that the payment managing server stores the terminal public key when the validity of the server authentication information is confirmed through a communication with a user authentication server, wherein the user terminal receives the user authentication information from the user authentication server as a result of performing user authentication in the user authentication server, and an electronic signature information managing unit for encrypting electronic signature information with the terminal private key and sending the encrypted electronic signature information to the payment managing server when there is a request for payment.

According to an embodiment of the present invention, security of the payment means may be reinforced by performing encryption and decryption through an asymmetric key generated by a user terminal during the payment process.

According to an embodiment of the present invention, a non-repudiation method not including a trusted third party may be implemented by determining validity of asymmetric keys sent to the payment managing server on the user terminal and generating a non-repudiation token including the entire payment process by the payment managing server.

The effect of the present invention is not limited to the above effects, and it is to be understood to include all possible effects deduced from the configuration of the invention described in the detailed description or claims.

DETAILED DESCRIPTION

Hereinafter, the present disclosure will be explained with reference to the accompanying drawings. The present disclosure, however, may be modified in various different ways, and should not be construed as limited to the embodiments set forth herein. Also, in order to clearly explain the present disclosure, portions that are not related to the present disclosure are omitted, and like reference numerals are used to refer to like elements throughout.

Throughout the specification, it will be understood that when an element is referred to as being "connected to" another element, it may be "directly connected to" the other element, or intervening elements or layers may be present. Also, it will also be understood that when a component "includes" an element, unless there is another opposite description thereto, it should be understood that the component does not exclude another element but may further include another element.

In embodiments of the present disclosure, a pair of asymmetric keys, e.g., a terminal public key and a terminal private key, are used to implement an asymmetric encryption method. Information encrypted with the terminal public key may be decrypted only with the terminal private key, and information encrypted with the terminal private key may be decrypted only with the terminal public key. The terminal public key may be open to the public so that it can be accessed by the public, but the terminal private key may be accessed only by someone who generated the terminal private key, and shall not be provided to others in any case.

In embodiments of the present disclosure, in addition to the terminal public key and the terminal private key, a server public key and a server private key may be used. The terminal public key and terminal private key may be generated and managed by a user terminal, and the server public key and server private key may be generated and managed by a payment managing server.

Hereinafter, embodiments of the present disclosure will be described in more detail with reference to the accompanying drawings.

Figure 1:
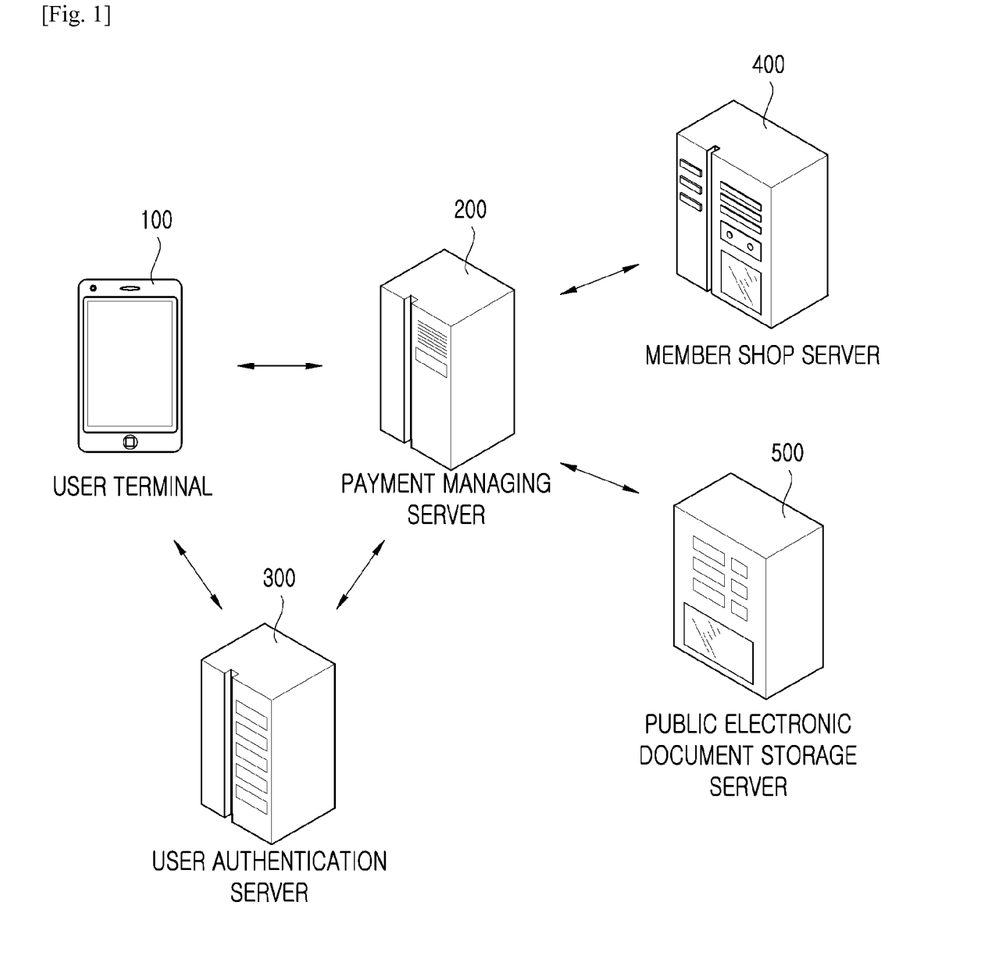
FIG. 1 is a schematic diagram of a system for implementing non-repudiation according to an embodiment of the present disclosure.

FIG. 1 is a schematic diagram of a system for implementing non-repudiation according to an embodiment of the present disclosure.

The system for implementing non-repudiation may include a user terminal 100, a payment managing server 200, a user authentication server 300, a member shop server 400, and a public electronic document storage server 500.

The user terminal 100 may be implemented by digital equipment including a GPS receiver. The user terminal 100 may be any digital equipment that includes a memory and a processor, such as a mobile phone or smartphone, tablet PC, personal computer (e.g., desktop computer, laptop computer, etc.), work station, PDA, web pad, etc.

Each of the payment managing server 200, the user authentication server 300, the member shop server 400, and the public electronic document storage server 500 may be implemented with any computing system including at least a memory and a processor to perform its operations.

The user terminal 100 may be a digital equipment performing operations requested by a user through predetermined data processing. The user terminal 100 may include an input device and a display device in addition to a memory and a processor. The user terminal 100 may receive operational commands from the user through the input device, perform specific operations corresponding to the operational commands using the processor, and provide operational results to the user through the display device.

An application for payment may be installed in the user terminal 100. The user terminal 100 may perform user authentication, register a payment means, request a payment, etc. through the application. Thus, operations of the user terminal 100 explained below may be performed by or through the application.

According to an embodiment, the user terminal 100 may receive a server public key from the payment managing server 200 and store the server public key. The server public key may be opened to the public by the payment managing server 200 so that it can be accessed by the public. Thus, the user terminal 100 may directly receive the server public key from the payment managing server 200, and/or obtain the server public key distributed by the payment managing server 200 through other routes. According to another embodiment, when there is a plurality of user terminals, the payment managing server 200 may generate and send server public keys having different values to each of the plurality of user terminals.

According to an embodiment, during a process of user authentication of the user terminal 100 performed prior to a process of payment, the user terminal 100 may perform the user authentication by sending personal information to the user authentication server 300, receiving user authentication information from the user authentication server 300, and sending the user authentication information to the payment managing server 200.

According to an embodiment, the user authentication server 300 may be a communications operator server, and the user authentication information may include an authentication number generated by the communications operator server. The user may acquire the authentication number received through the user terminal 100, and send the authentication number to the payment managing server 200 through the user terminal 100. The user terminal 100 may receive the authentication number through short message service (SMS), and/or receive the authentication number in the form of a push message, etc. through an application installed in the user terminal 100. In an embodiment, the user terminal 100 automatically sends the authentication number to the payment managing server 200.

In another embodiment, the user authentication server 300 may be an Internet Personal Identification Number (i-PIN) server, and the user terminal 100 may receive user authentication information generated by the i-PIN server and send the user authentication information to the payment managing server 200.

Any verified user authentication method may be used to implement the present invention in addition to user authentication of the user terminal 100 through a communication with the communications operator server and personal authentication using an i-PIN. Preferably, user authentication by employing a challenge-response method may be used.

During the process of user authentication, the user terminal 100 may encrypt the user authentication information with the server public key received from the payment managing server 200 and send the encrypted user authentication information to the payment managing server 200.

The user terminal 100 may generate and manage a terminal private key and a terminal public key, and encrypt the terminal public key with the server public key received from the payment managing server 200, and send the encrypted terminal public key to the payment managing server 200.

In order to perform payment, the user terminal 100 may receive a request for register a payment means from the user, store payment means information corresponding to the payment means in the user terminal 100, and use the stored payment means information for each payment. In this regard, when registering a payment means, the user terminal 100 may receive a master key from the payment managing server 200, encrypt the payment means information using the master key, and delete the used master key after the encryption. Then, when performing payment, the user terminal 100 may receive the master key again from the payment managing server 200 and decrypt the encrypted payment means information using the received master key. Even in this case, as soon as the payment is completed, the decrypted payment means information and the master key used for the decryption in the user terminal 100 may be deleted.

According to an embodiment, the payment means may be a card. In this case, the user terminal 100 may send an authentication request to a credit card company server when it has received a request for payment means registration from the user. When it is determined that the card to be registered is a valid card and thus the use terminal 100 receives a response indicative of the determination result from the credit card company server, the user terminal 100 may encrypt information on the card using the masker key received from the payment managing server 200 and store the encrypted card information. The card may include any of a check card, a credit card, a debit card, etc. In another embodiment, the user may make payment through micropayment using cellular phones, ARS, etc.

When the user terminal 100 performs a payment request by selecting one of the registered payment means, an electronic signature may be performed using the terminal private key. In an embodiment, electronic signature information may be produced by logically combining certain data in an electronic form to payment related information. The electronic signature information is used for the purpose of confirming the identity of a signatory and showing the signatory's approval on information on which the electronic signature is performed.

Specifically, the user terminal 100 may send the electronic signature information to the payment managing server 200. In an embodiment, the electronic signature information is obtained by encrypting the payment related information on which the electronic signature is performed with the terminal private key. The payment managing server 200 may receive the electronic signature information and obtain the payment related information by decrypting the electronic signature information using the terminal public key received in advance.

The terminal private key generated by the user terminal 100 may be stored only in the user terminal 100 after being generated. Thus, the terminal private key is assumed to be present only in the user terminal 100, and non-repudiation may be performed by encrypting the electronic signature information with the terminal private key.

According to an embodiment, an access password for activating the terminal private key stored in the user terminal 100 may be set by the user. The access password may be set at a time period when the user authentication is completed by the user terminal 100.

After performing the electronic signature on the payment related information, the user terminal 100 may ask the user to input an access password, and activate the terminal private key only when it is determined that the access password input by the user in response to the asking of the user terminal 100 is the same as the access password that was previously set by the user.

The payment managing server 200 may be a server managed by a company that performs payment by receiving a payment request from the user terminal 100, manages payment related information, sends the payment related information to a member shop at which the user intends to perform payment, and later balances accounts based on the payment.

The payment managing server 200 may generate the server public key and the server private key, and send the server public key to the user terminal 100. The payment managing server 200 may manage the server private key so that the server private key is not leaked to outsiders by any means.

The user terminal 100 may send a user authentication request to the user authentication server 300, receive user authentication information from the user authentication server 300, encrypt the user authentication information with the server public key, and send the encrypted user authentication information to the payment managing server 200. The payment managing server 200 may decrypt the encrypted user authentication information with the server private key and ask the user authentication server 300 to confirm whether the user authentication information received from the user terminal 100 is valid or not.

In an embodiment, the payment managing server 200 may receive the terminal public key encrypted with the server public key in the step of starting to perform the user authentication in the user terminal 100 and decrypt the received terminal public key with the server private key. Then, the payment managing server 200 may ask the user authentication server 300 to determine whether the user authentication information received from the user terminal 100 is valid or not. The validity of the user authentication information is determined by comparing the user authentication information received from the user terminal 100 with user authentication information that has been sent to the user terminal 100 and is stored in the user authentication server 300. When the user authentication information received from the user terminal 100 is the same as the user authentication information stored in the user authentication server 300, the user authentication information received from the user terminal 100 is determined to be valid. When it is determined that the user authentication information is valid, the payment managing server 200 may confirm the validity of the terminal public key received from the user terminal 100 and store the terminal public key.

On the other hand, when the user authentication information received from the user terminal 100 is determined to be invalid, the payment managing server 200 may determine that the terminal public key received from the user terminal 100 is invalid and delete the terminal public key without storing the key therein.

The payment managing server 200 may receive the request for payment means registration from the user terminal 100. The payment means information may be stored separately in the user terminal 100 and payment managing server 200. In order to register a payment means corresponding to the payment means information in the user terminal 100, the payment managing server 200 may send the master key to the user terminal 100, and instruct, through an application installed in the user terminal 100, the user terminal 100 to encrypt the payment means information with the master key and delete the master key after the encryption.

Afterwards, when one of the payment means registered in the user terminal 100 is selected to perform payment, the payment managing server 200 re-sends the master key to the user terminal 100, and the user terminal 100 decrypts the encrypted payment means information with the re-sent master key and performs the payment using the decrypted payment means information. In an embodiment, the decrypted payment means information and the used master key are deleted after the payment is completed.

As such, the user terminal 100 receives the master key from the payment managing server 200 only when the master key is to be used, and deletes the master key after use. Thus, even if the payment means information stored in the user terminal 100 is leaked, since the master key that may decrypt the encrypted payment means information is stored only in the payment managing server 200, damage from the leakage by, e.g., hacking, etc. may be reduced.

When performing the payment, the payment managing server 200 may receive the electronic signature information for non-repudiation from the user terminal 100. Since the electronic signature information received from the user terminal 100 is transmitted after having been encrypted with the terminal private key generated by the user terminal 100, the payment managing server 200 may decrypt the electronic signature information using the terminal public key whose validity was determined when performing the user authentication and is stored therein. As such, the payment managing server 200 may determine the validity of an electronic signature by determining whether the transmitted electronic signature information is decrypted or not with the terminal public key at the time of payment.

The payment managing server 200 may perform the payment using the payment related information (e.g., payment subject, payment amount, payment time, etc.), the payment means information and the electronic signature information, received from the user terminal 100. For example, when the payment means is a credit card, the payment managing server 200 may request payment to a credit card company through communication with a credit card company server, receive a result of performing the payment, and send the received payment result to the user terminal 100.

In order to implement non-repudiation, the payment managing server 200 may generate a non-repudiation token and store the non-repudiation token therein. The non-repudiation token includes a series of data sent when using non-repudiation information, and it may be generated to include the electronic signature information, the payment related information, and the payment means information.

Thereafter, the payment managing server 200 may send the non-repudiation token to the server 400 of a member shop where payment was performed and/or to the user terminal 100 upon a user's request, thereby achieving non-repudiation. The user and the member shop may suppress the likelihood of non-repudiation of the opposite party using the non-repudiation token, e.g., the payment related information.

The payment managing server 200 may record log information relating to receiving and sending various information obtained during the user authentication, the request for payment means registration, and the payment request, which are performed as described above during the payment process. The payment managing server 200 may send the log information to the public electronic document storage server 500. The public electronic document storage server 500 may store the log information for a legal storage period, and grant legal force to the stored log information. Specifically, even if the log information stored in the public electronic document storage server 500 is received and sent by different equipment later on, the legal originality of the log information may be presumed.

Figure 2:
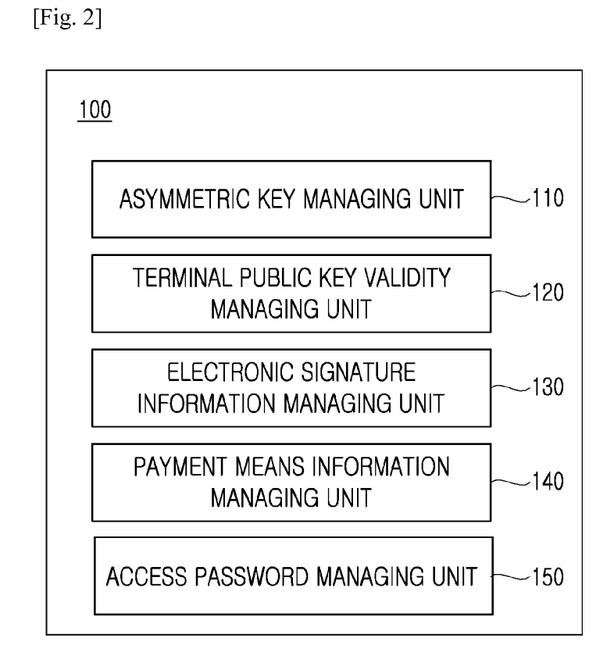
FIG. 2 is a block diagram illustrating a user terminal according to an embodiment of the present disclosure.

FIG. 2 is a block diagram illustrating the user terminal 100 according to an embodiment of the present disclosure.

The user terminal 100 may include an asymmetric key managing unit 110, a terminal public key validity managing unit 120, an electronic signature information managing unit 130, a payment means information managing unit 140, and an access password managing unit 150.

According to an embodiment of the present disclosure, the asymmetric key managing unit 110, the terminal public key validity managing unit 120, the electronic signature information managing unit 130, the payment means information managing unit 140, and the access password managing unit 150 may be implemented with program modules and/or hardware capable of communicating with an external device. Such program modules or hardware may be included in the user terminal 100 or other devices that may communicate with the user terminal 100, and the program modules may be provided as operating systems, application program modules, and/or other program modules. Physically, the program modules may be stored in various memory devices. Meanwhile, such program modules or hardware may include routine, sub-routine, program, object, component, data structure, etc. performing a specific task or processing a specific type of abstract data, which will be described below, but embodiments are not limited thereto.

The asymmetric key managing unit 110 may generate and manage a pair of asymmetric keys, e.g., a terminal public key and a terminal private key that may be paired therewith. The asymmetric key managing unit 110 may manage the terminal private key not to be leaked outside the user terminal 100, and may encrypt the terminal public key with a server public key provided by the payment managing server 200 and then send the encrypted terminal public key to the payment managing server 200.

The asymmetric key managing unit 110 may send the terminal private key to the electronic signature information managing unit 130 during a process of payment, so that payment related information is encrypted with the terminal private key to generate electronic signature information. Whether the terminal private kay is activated or not may be determined depending on an operational result of the access password managing unit 150, which will be described below.

The terminal public key validity managing unit 120 may perform user authentication through a communication with the user authentication server 300. Specifically, when the user terminal 100 transmits personal information for the user authentication to the user authentication server 300 through a payment related application installed in the user terminal 100, the user authentication server 300 may generate user authentication information and send it to the user terminal 100, and the terminal public key validity managing unit 120 may encrypt the user authentication information with the server public key and send the encrypted user authentication information to the payment managing server 200.

Thereafter, the terminal public key validity managing unit 120 may allow the payment managing server 200 to determine the validity of the terminal public key by confirming the validity of the user authentication information and store the terminal public key that has been determined to be valid.

The electronic signature information managing unit 130 may perform an electronic signature on the payment related information using the terminal private key generated by the asymmetric key managing unit 110 when a user performs payment using the user terminal 100. After that, the electronic signature information managing unit 130 may send electronic signature information to the payment managing server 200 that in turn proceeds with payment.

The payment means information managing unit 140 may manage payment means information registered by the user by encrypting the payment means information. Specifically, the payment means information managing unit 140 may encrypt information on a payment means requested to be registered by the user with a master key received from the payment managing server 200, and delete the master key after the encryption.

Thereafter, when performing payment using the payment means registered by the user, the payment means information managing unit 140 may receive the master key again from the payment managing server 200 and decrypt the encrypted payment means information with the re-received master key. In an embodiment, the payment means information managing unit 140 may delete the master key used for the decryption and the decrypted payment means information after the payment is completed, and obtain the master key again for another payment, thereby increasing the security of the payment means information.

The access password managing unit 150 may manage access authority on the terminal private key generated by the asymmetric key generating unit 110. The access password managing unit 150 may request the user to set an access password when the user terminal 100 completes user authentication through a communication with the user authentication server 300, and store the input access password. Also, the access password managing unit 150 may inactivate the terminal private key so as to prevent access to the terminal private key.

Thereafter, the access password managing unit 150 may request the user to input an access password when the electronic signature information managing unit 130 intends to generate the electronic signature information using the terminal private key, and activate the terminal private key only when the user inputs the same access password as the pre-set access password, so that the electronic signature information managing unit 130 may generate the electronic signature information using the activated terminal private key.

In an embodiment, the asymmetric key managing unit 110, the terminal public key validity managing unit 120, the electronic signature information managing unit 130, the payment means information managing unit 140, and the access password managing unit 150 may be implemented with at least one processor coupled to at least one memory.

Figure 3:
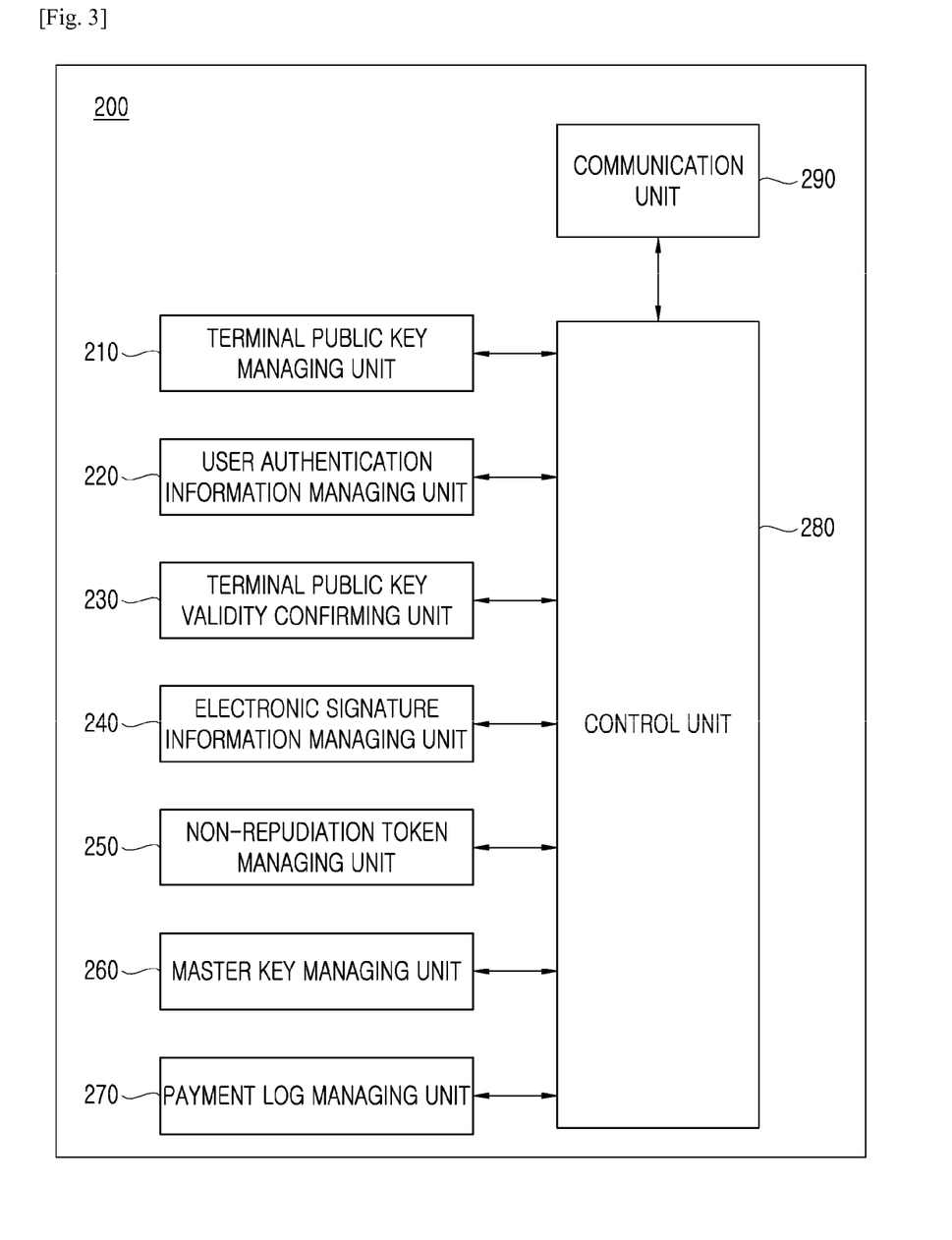
FIG. 3 is a block diagram illustrating a payment managing server according to an embodiment of the present disclosure.

FIG. 3 is a block diagram illustrating the payment managing server 200 according to an embodiment of the present disclosure.

The payment managing server 200 may include a terminal public key managing unit 210, a user authentication information managing unit 220, a terminal public key validity confirming unit 230, an electronic signature information managing unit 240, a non-repudiation token managing unit 250, a master key managing unit 260, a payment log managing unit 270, a control unit 280 and a communication unit 290.

According to an embodiment of the present disclosure, the terminal public key managing unit 210, the user authentication information managing unit 220, the terminal public key validity confirming unit 230, the electronic signature information managing unit 240, the non-repudiation token managing unit 250, the master key managing unit 260, the payment log managing unit 270, the control unit 280 and the communication unit 290 may be implemented with program modules and/or hardware communicating with an external device. Such program modules or hardware may be included in the payment managing server 200 or other devices that may communicate with the payment managing server 200, the program modules may be provided as operating systems, application program modules, and/or other program modules. Physically, the program modules may be stored in various memory devices. Meanwhile, such program modules or hardware may include a routine, sub-routine, program, object, component, data structure, etc. for performing a specific task or processing a specific type of abstract data, which will be described below, but embodiments are not limited thereto.

When user authentication begins, the terminal public key managing unit 210 may receive a terminal public key, which has been encrypted with a server public key, from the user terminal 100, and store the terminal public key.

The user authentication information managing unit 220 may receive user authentication information, which has been encrypted with the server public key, from the user terminal 100 when performing the user authentication through the user terminal 100. Then, the user authentication information managing unit 220 may decrypt the received user authentication information, and determine whether the received user authentication information is the same as user authentication information sent to the user terminal 100 by the user authentication server 300 through a communication with the user authentication server 300.

The terminal public key validity confirming unit 230 may determine that the received terminal public key is valid when the user authentication server 300 determines that the user authentication information sent to the user terminal 100 is the same as the user authentication information received from the user terminal 100, and store the terminal public key.

The electronic signature information managing unit 240 may receive electronic signature information, which has been encrypted with a terminal private key, from the user terminal 100 when payment is performed using a registered payment means. The electronic signature information managing unit 240 may decrypt the electronic signature information received from the user terminal 100 using the terminal public key whose validity has been confirmed by the terminal public key validity confirming unit 230.

The non-repudiation token managing unit 250 may achieve non-repudiation by generating a non-repudiation token used for the non-repudiation, and sending the token to the member shop server 400 that is a subject of the payment and/or to the user terminal 100. The non-repudiation token generated by the non-repudiation token managing unit 250 may include electronic signature information, payment related information (e.g., payment subject, payment amount, payment time, etc.) and payment means information (e.g., card number, installment information, etc.).

The master key managing unit 260 may manage a master key used when encrypting and decrypting the payment means information in the user terminal 100 and send the master key to the user terminal 100 only when there is a request from the user terminal 100, and may receive, from the user terminal 100, information on whether the master key is used and then deleted by the user terminal 100, and manage the received information.

The master key managing unit 260 may receive a request for registration of a payment means from the user terminal 100 and send the master key to the user terminal 100 in response to the request. Thereafter, whenever performing payment using the payment means registered in the user terminal 100, the master key managing unit 260 may re-send the master key to the user terminal 100, and manage the master key to be deleted after it is used once through the application installed in the user terminal 100.

The payment log managing unit 270 may store log information obtained when each component of the payment managing server 200 performs its function and send the log information to the public electronic document storage server 500 that grants legal force to the log information.

The control unit 280 may control data flow among the terminal public key managing unit 210, the user authentication information managing unit 220, the terminal public key validity confirming unit 230, the electronic signature information managing unit 240, the non-repudiation token managing unit 250, the master key managing unit 260, the payment log managing unit 270 and the communication unit 290. That is, the control unit 280 may control the terminal public key managing unit 210, the user authentication information managing unit 220, the terminal public key validity confirming unit 230, the electronic signature information managing unit 240, the non-repudiation token managing unit 250, the master key managing unit 260, the payment log managing unit 270 and the communication unit 290 so that they perform their own functions.

The communication unit 290 allows the payment managing server 200 to communicate with an external device. Specifically, the communication unit 290 allows the payment managing server 200 to communicate with the user terminal 100, the user authentication server 300, the member shop server 400, and the public electronic document storage server 500.

In an embodiment, the terminal public key managing unit 210, the user authentication information managing unit 220, the terminal public key validity confirming unit 230, the electronic signature information managing unit 240, the non-repudiation token managing unit 250, the master key managing unit 260, the payment log managing unit 270, and the control unit 280 may be implemented with at least one processor coupled to at least one memory. The communication unit 290 may be implemented with a transmitter/receiver.

Figure 4:
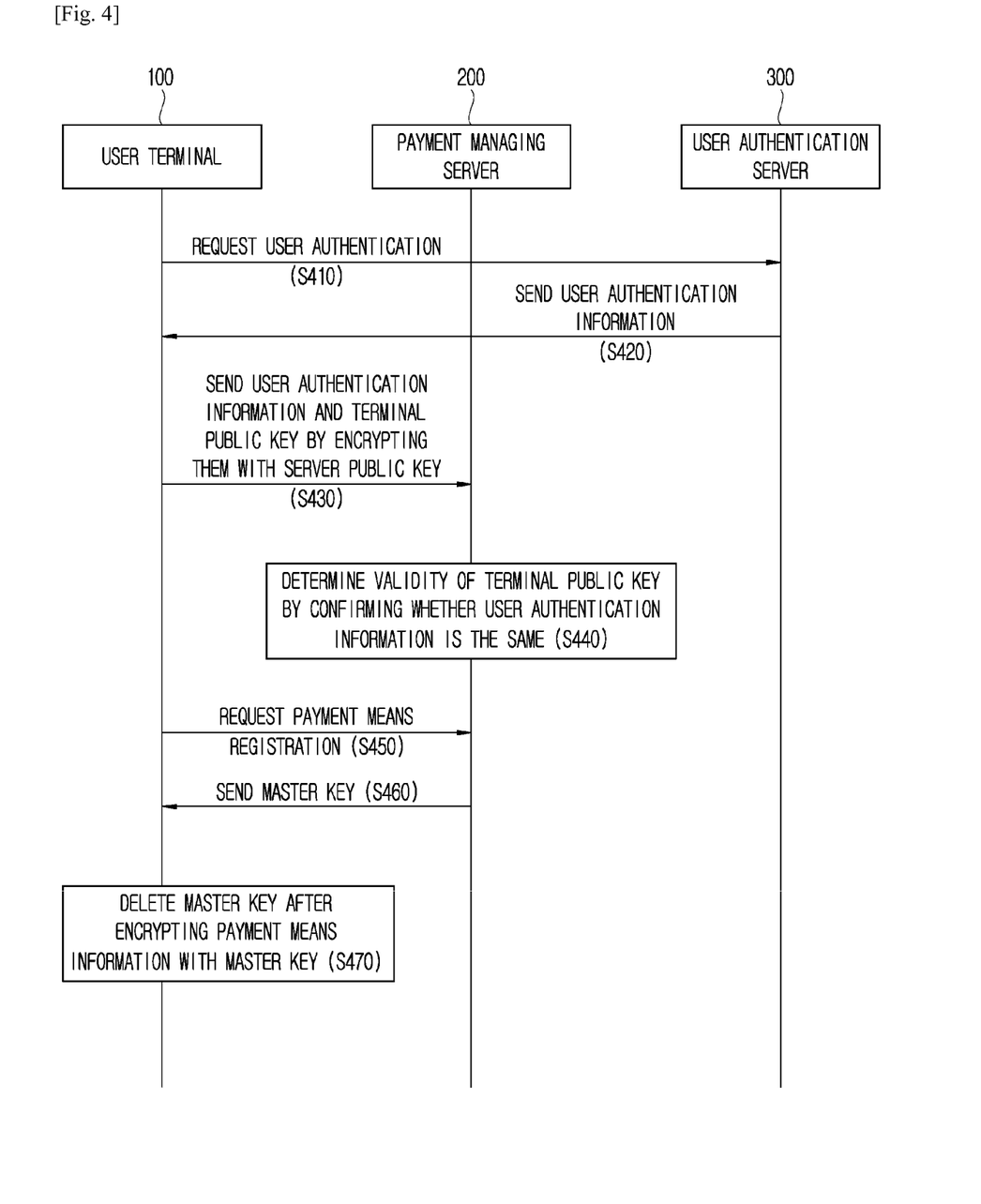
FIG. 4 is a flow chart illustrating a method for registering a payment means for non-repudiation according to an embodiment of the present disclosure.

FIG. 4 is a flow chart illustrating a method for registering a payment means for non-repudiation according to an embodiment of the present disclosure.

Referring to FIG. 4, when the user terminal 100 requests user authentication to the user authentication server 300 (S410), the user authentication server 300 may perform the user authentication, generate user authentication information indicative of the success of the user authentication, and send the user authentication information to the user terminal 100 (S420).

After receiving the user authentication information from the user authentication server 300, the user terminal 100 may encrypt the received user authentication information and a terminal public key using a server public key and send the encrypted user authentication information and the encrypted terminal public key to the payment managing server 200 (S430).

The payment managing server 200 may decrypt the encrypted user authentication information and the encrypted terminal public key received from the user terminal 100 using a server private key, determine whether the user authentication information generated by the user authentication server 300 and then sent to the user terminal 100 is the same as the user authentication information received from the user terminal 100, determine that the received terminal public key is valid when the user authentication information generated by the user authentication server 300 is the same as the user authentication information received from the user terminal 100, and store the terminal public key determined to be valid (S440).

Thereafter, the user terminal 100 may send a request for payment means registration to the payment managing server 200 (S450), and the payment managing server 200 may send a master key to the user terminal 100 in response to the request (S460).

The user terminal 100 may encrypt payment means information registered by the user using the master key and then delete the master key used for the encryption (S470).

Through the above steps S410 to S470, the payment managing server 200 may determine the validity of the terminal public key received from the user terminal 100 as well as performing user authentication using the user authentication information, and, since the user terminal 100 may store the payment means information encrypted with the master key without storing the master key therein, it is possible to improve security on the payment means information.

Figure 5:
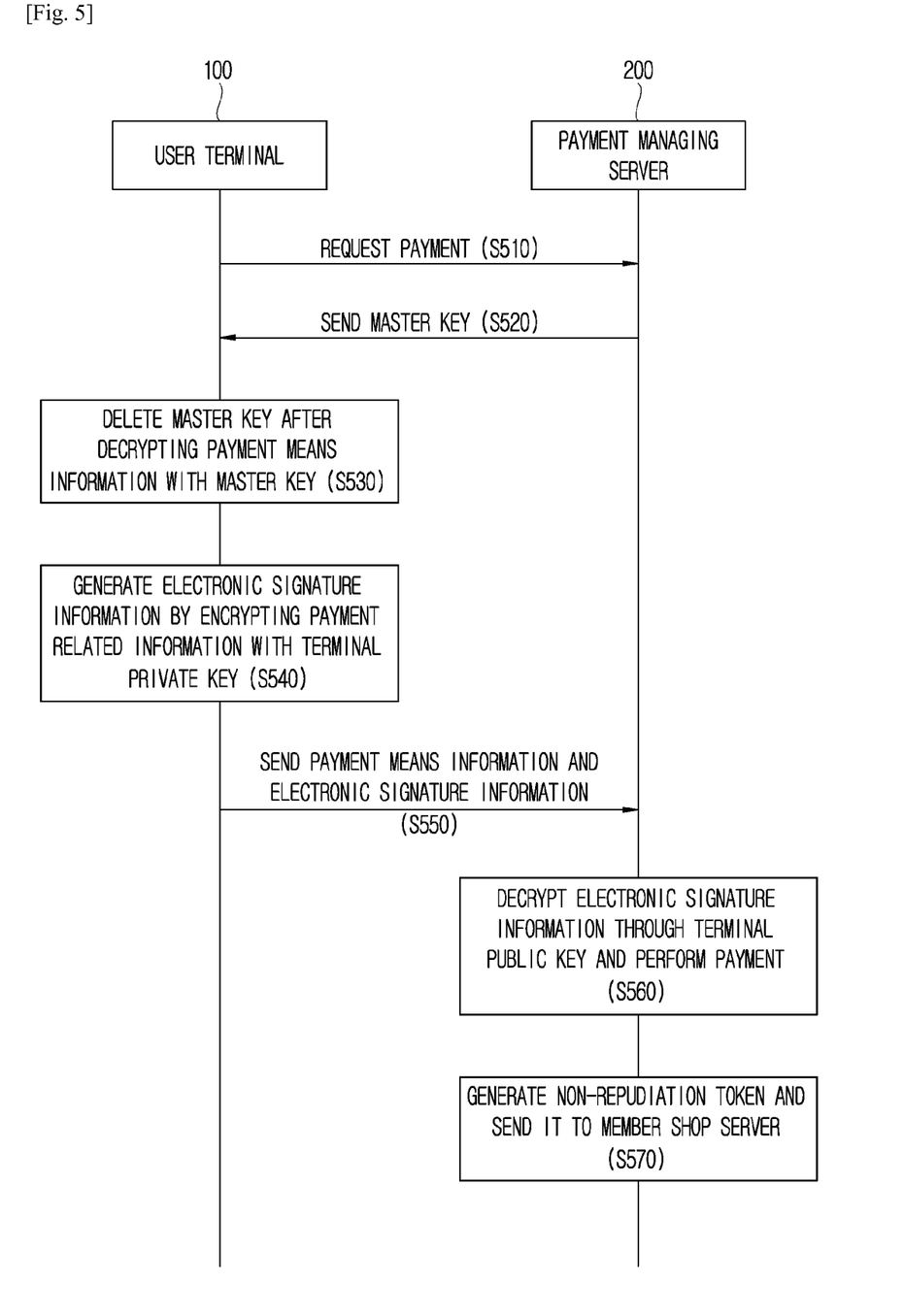
FIG. 5 is a flow chart illustrating a payment method for non-repudiation according to an embodiment of the present disclosure.

FIG. 5 is a flow chart illustrating a payment method for non-repudiation according to an embodiment of the present disclosure.

Hereinafter, an explanation will be made by assuming that each process in FIG. 4 has been performed before performing payment as illustrated in the flow chart of FIG. 5.

When a user intends to perform payment, the user terminal 100 may send a request for payment to the payment managing server 200 (S510), and receive again a master key used when encrypting payment means information (S520).

The user terminal 100 may decrypt the encrypted payment means information with the master key received from the payment managing server 200 and delete the used master key after the decryption (S530).

The user terminal 100 may generate electronic signature information by encrypting payment related information with a terminal private key (S540). Thereafter, the user terminal 100 may send information on a good or service for which the user intends to perform the payment, the payment means information and the electronic signature information to the payment managing server 200 (S550).

The payment managing server 200 may decrypt the electronic signature information using a terminal public key whose validity has been determined and stored therein in advance, and may perform the payment based on payment related information, the payment means information, etc. received from the user terminal 100 (S560).

In an embodiment, the payment managing server 200 may communicate with external devices such as a credit card company server when performing the payment and send results of performing the payment to the user terminal 100.

In order to achieve non-repudiation of the payment performed, the payment managing server 200 may generate a non-repudiation token including a series of information related to the payment process and send it to the member shop server 400 (S570). Also, the payment managing server 200 may send the non-repudiation token to the user terminal 100 upon a request of the user.

In accordance with the embodiments of the present disclosure, the purpose of non-repudiation may be achieved and information security may be improved during the payment process by performing payment using asymmetric keys generated by a user terminal and a master key generated by a payment managing server without involving a trusted third party.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Therefore, it should be understood that the forgoing description is by way of example only, and is not intended to limit the present disclosure. For example, each constituent explained in singular form may be carried out being dispersed, and likewise, constituents explained as being dispersed may be carried out in combined forms.

The scope of the present disclosure is defined by the foregoing claims, and it is intended that the present disclosure covers the modifications or variations of the present disclosure provided they come within the scope of the appended claims and their equivalents.

What is claimed is:

1. A method for implementing non-repudiation of payment, comprising:
 a method performed by a payment managing server, comprising:
  receiving, from a user terminal, a terminal public key of a pair of asymmetric keys generated by the user terminal and user authentication information, the user authentication information having been generated by a user authentication server as a result of performing user authentication in the user authentication server and transmitted to the user terminal;
  receiving user authentication information from the user authentication server;
  confirming the validity of the user authentication information received from the user terminal when the user authentication information received from the user terminal is the same as the user authentication information received from the user authentication server;
  storing the received terminal public key in response to the validity of the user authentication information;
  receiving a payment request from the user terminal;
  receiving, from the user terminal, electronic signature information that has been encrypted with a terminal private key of the pair of asymmetric keys; and
  decrypting the electronic signature information using the stored terminal public key,
  wherein the method performed by the payment managing server further comprises:
  generating a master key; and
  sending the master key to the user terminal in response to a request for registering a payment means from the user terminal, wherein the user terminal encrypts payment means information with the master key, stores encrypted payment means information therein, and deletes the master key after the encryption of the payment means information,
  wherein the method performed by the payment managing server further comprises:
  re-sending the master key to the user terminal in response to the payment request from the user terminal, wherein the user terminal decrypts the encrypted payment means information stored in the user terminal using the re-sent master key, uses the decrypted payment means information to perform the payment, and deletes the re-sent master key after the decryption of the encrypted payment means information, wherein the method performed by the payment managing server further comprises:

whenever performing payment using the payment means registered in the user terminal, managing usage information on whether the master key is used and deleted by the user terminal, the usage information being received from the user terminal, wherein the master key is managed to be deleted after the master key is used once through an application installed in the user terminal, wherein the method performed by the payment managing server further comprises:

performing the payment using the stored terminal public key and the re-sent master key in response to the payment request from the user terminal;

after performing the payment, generating a non-repudiation token that includes the electronic signature information, the payment related information, and the payment means information; and sending the non-repudiation token to at least one of a member shop server and the user terminal to implement the non-repudiation, wherein the user terminal manages access authority on the terminal private key using a pre-set access password by a user to encrypt the electronic signature information with the terminal private key for the payment request, wherein the user terminal receives an access password and activates the terminal private key in response to the access password that is the same as the pre-set access password, wherein the user terminal receives a server public key from the payment managing server, encrypts the terminal public key and the user authentication information using the server public key, and sends an encrypted terminal public key and encrypted user authentication information to the payment managing server, and then the payment managing server decrypts the encrypted terminal public key and the encrypted user authentication information using a server private key, and wherein the user authentication server receives the server public key from the payment managing server, encrypts the user authentication information using the server public key, and sends encrypted user authentication information to the payment managing server, and then the payment managing server decrypts the encrypted user authentication information received from the user authentication server using the server private key.

2. The method of claim 1, wherein the method performed by the payment managing server further comprises:

generating log information relating to a payment process and sending the log information to a public electronic document storage server.

3. A method for implementing non-repudiation of payment, comprising:

a method performed by a user terminal, comprising:

generating a pair of asymmetric keys including a terminal public key and a terminal private key;

receiving a server public key from a payment managing server;

receiving user authentication information from a user authentication server as a result of performing user authentication in the user authentication server;

encrypting the terminal public key and the user authentication information with the server public key; and sending encrypted terminal public key and encrypted user authentication information to the payment managing server, such that the payment managing server stores the terminal public key in response to the validity of the user authentication information received from the user terminal, the validity of the first user authentication information being confirmed when the user authentication information received from the user terminal is the same as user authentication information received from the user authentication server;

encrypting electronic signature information with the terminal private key; and sending encrypted electronic signature information to the payment managing server in response to a request for payment, wherein the method performed by the user terminal further comprises:

receiving a master key a first time from the payment managing server in order to register a payment means;

encrypting payment means information with the master key and storing encrypted payment means information therein;

deleting the master key after the encryption of the payment means information;

receiving the master key a second time, after deleting the master key, from the payment managing server;

decrypting the encrypted payment means information with the master key in response to the request for payment;

deleting the master key received the second time after the decryption of the encrypted payment means information; and managing access authority on the terminal private key using a pre-set access password by a user to encrypt the electronic signature information with the terminal private key for the payment request, wherein the method performed by the user terminal further comprises:

whenever performing the payment using the payment means registered in the user terminal, sending, to the payment managing server, usage information on whether the master key is used and deleted by the user terminal, wherein the master key is managed to be deleted after the master key is used once through an application installed in the user terminal, wherein the payment managing server performs the payment using the stored terminal public key and the master key in response to the payment request from the user terminal, generates a non-repudiation token after performing the payment, and sends the non-repudiation token to at least one of a member shop server and the user terminal to implement the non-repudiation, the non-repudiation token including the electronic signature information, the payment related information, and the payment means information, wherein the method performed by the user terminal further comprises:

receiving an access password and activating the terminal private key in response to the access password that is the same as the pre-set access password, wherein the payment managing server decrypts the encrypted terminal public key and the encrypted user authentication information received from the user terminal using a server private key, and wherein the user authentication server receives the server public key from the payment managing server, encrypts the user authentication information using the server public key, and sends encrypted user authentication information to the payment managing server, and then the payment managing server decrypts the encrypted user authentication information received from the user authentication server using the server private key.

4. A system for implementing non-repudiation of payment, comprising:

a payment managing server comprising:
at least one processor configured to:
receive a terminal public key of a pair of asymmetric keys from a user terminal;
receive, from the user terminal, user authentication information, the user authentication information being provided to the user terminal by a user authentication server as a result of performing user authentication in a user authentication server;
receive, from the user authentication server, user authentication information;
confirm the validity of the user authentication information received from the user terminal when the user authentication information received from the user terminal is the same as the user authentication information received from the user authentication server;
store the terminal public key in response to the validity of the user authentication information;
receive encrypted electronic signature information together with a payment request from the user terminal;
decrypt the encrypted electronic signature information with the stored terminal public key;
generate a master key;
send the master key to the user terminal in response to a request for registering a payment means from the user terminal, and allow the user terminal to encrypt payment means information with the master key, store encrypted payment means information therein, and delete the master key after the encryption of the payment means information,
wherein the master key is re-sent to the user terminal in response to the payment request from the user terminal, such that the user terminal decrypts the encrypted payment means information using the re-sent master key, uses the decrypted payment means information to perform the payment, and deletes the re-sent master key after the decryption of the encrypted payment means information,
wherein the at least one processor is configured to perform the payment using the stored terminal public key and the master key,
wherein the at least one processor is further configured to:
whenever performing payment using the payment means registered in the user terminal, manage usage information on whether the master key is used and deleted by the user terminal, the usage information being received from the user terminal,
wherein the master key is managed to be deleted after the master key is used once through an application installed in the user terminal,
wherein the at least one processor is further configured to:
after performing the payment, generate a non-repudiation token that includes the electronic signature information, the payment related information, and the payment means information; and
send the non-repudiation token to at least one of a member shop server and the user terminal, and
wherein the user terminal manages access authority on the terminal private key and then encrypts the electronic signature information with the terminal private key for the payment request,
wherein the user terminal receives an access password and activates the terminal private key in response to the access password that is the same as a pre-set access password,
wherein the user terminal receives a server public key from the payment managing server, encrypts the terminal public key and the user authentication information with a server public key, and sends encrypted terminal public key and encrypted user authentication information to the payment managing server, and then the payment managing server decrypts the encrypted terminal public key and the encrypted user authentication information received from the user terminal using a server private key, and
wherein the user authentication server receives the server public key from the payment managing server, encrypts the user authentication information with the server public key, and sends encrypted user authentication information to the payment managing server, and then the payment managing server decrypts the encrypted user authentication information received from the user authentication server using the server private key.

5. The system of claim 4, wherein the at least one processor is further configured to:
generate log information relating to a payment process and send the log information to a public electronic document storage server.

6. A system for implementing non-repudiation of payment, comprising:

a user terminal comprising:
at least one processor configured to:
generate a pair of asymmetric keys including a terminal public key and a terminal private key;
receive a server public key from a payment managing server;
receive user authentication information from a user authentication server as a result of performing user authentication in the user authentication server;
encrypt the terminal public key and the user authentication information with the server public key; and
send encrypted terminal public key and encrypted user authentication information to the payment managing server, such that the payment managing server stores the terminal public key in response to the validity of the user authentication information received from the user terminal, the validity of the user authentication information being confirmed when the user authentication information received from the user terminal is the same as the user authentication information received from the user authentication server;

encrypt electronic signature information with the terminal private key;

send the encrypted electronic signature information to the payment managing server in response to a request for payment;

receive a master key from the payment managing server a first time, encrypt payment means information with the master key, store encrypted payment means information, delete the master key after the encryption of the payment means information, receive the master key from the payment managing server a second time, decrypt the encrypted payment means information with the re-received master key in response to the request for payment, and delete the re-received master key after the decryption of the encrypted payment means information, and manage access authority on the terminal private key and then encrypt the electronic signature information with the terminal private key for the payment request, wherein the at least one processor is further configured to:

whenever performing the payment using the payment means registered in the user terminal, send, to the payment managing server, usage information on whether the master key is used and deleted by the user terminal, wherein the master key is managed to be deleted after the master key is used once through an application installed in the user terminal, wherein the payment managing server performs the payment with the stored terminal public key and the master key, generates a non-repudiation token after performing the payment, and sends the non-repudiation token to at least one of a member shop server and the user terminal, the non-repudiation token including the electronic signature information, the payment related information, and the payment means information, wherein the at least one processor is configured to receive an access password and activate the terminal private key in response to the access password that is the same as a pre-set access password, wherein the payment managing server decrypts the encrypted terminal public key and the encrypted user authentication information received from the user terminal using a server private key, and wherein the user authentication server receives the server public key from the payment managing server, encrypts the user authentication information with the server public key, and sends encrypted user authentication information to the payment managing server, and then the payment managing server decrypts the encrypted user authentication information received from the user authentication server using the server private key.

* * * * *